United States Patent [19]

Bilac et al.

[11] Patent Number: 4,672,501
[45] Date of Patent: Jun. 9, 1987

[54] CIRCUIT BREAKER AND PROTECTIVE RELAY UNIT

[75] Inventors: Mario M. Bilac; John J. Dougherty, both of Avon; Indrajit Purkayastha, Collinsville, all of Conn.; William J. Premerlani, Scotia, N.Y.

[73] Assignee: General Electric Company, New York, N.Y.

[21] Appl. No.: 626,341

[22] Filed: Jun. 29, 1984

[51] Int. Cl.$^4$ .............................................. H02H 3/00
[52] U.S. Cl. ....................................... 361/96; 361/97; 361/42; 361/47; 307/200 A; 365/201; 364/483; 364/492
[58] Field of Search ...................... 361/96, 97, 95, 87, 361/79, 94, 93, 71; 364/483, 492; 307/200 A; 365/201

[56] References Cited

U.S. PATENT DOCUMENTS

| | | | |
|---|---|---|---|
| 4,261,038 | 4/1981 | Johns et al. | 361/79 X |
| 4,321,681 | 3/1982 | Sackin et al. | 364/492 |
| 4,371,947 | 2/1983 | Fujisawa | 364/900 |
| 4,419,737 | 12/1983 | Yamaura et al. | 364/900 |
| 4,428,022 | 1/1984 | Engel et al. | 361/97 X |
| 4,432,031 | 2/1984 | Premerlani | 364/483 X |
| 4,535,409 | 8/1985 | Jindrick et al. | 361/71 X |
| 4,550,360 | 10/1985 | Dougherty | 361/96 X |

OTHER PUBLICATIONS

Peatman, John B., "Microcomputer-Based Design", McGraw-Hill, 1977, pp. 312-318.

Primary Examiner—Patrick R. Salce
Assistant Examiner—Marc S. Hoff
Attorney, Agent, or Firm—Richard A. Menelly; Walter C. Bernkopf; Fred Jacob

[57] ABSTRACT

Circuit protection and protective relay functions are provided by common circuit elements under the control of a single processor unit. Voltage and current values are obtained on a continuous basis and these values are continuously monitored within the processor to determine the electrical status of a protected power distribution system. Upon the occurrence of an overcurrent or undervoltage condition, the circuit is interrupted by operation of a circuit breaker trip solenoid causing the breaker contacts to open. When the overcurrent or undervoltage condition ceases to exist, the circuit breaker contacts could be closed by operation of a controlled relay. The ROM and RAM storage elements within the processor unit are continuously tested and the circuit breaker contacts are opened upon indication that the ROM or RAM element is nonfunctional.

1 Claim, 12 Drawing Figures

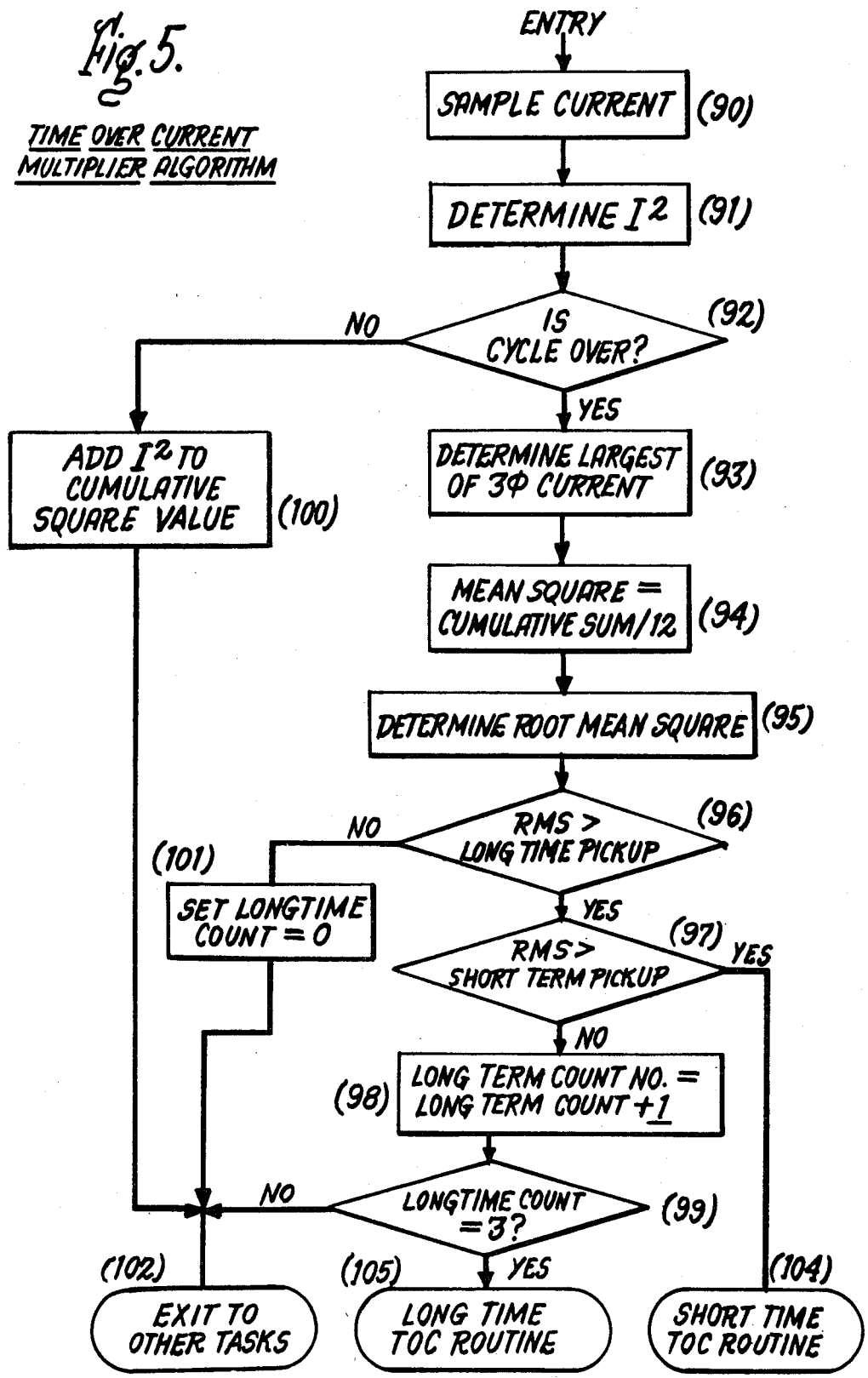

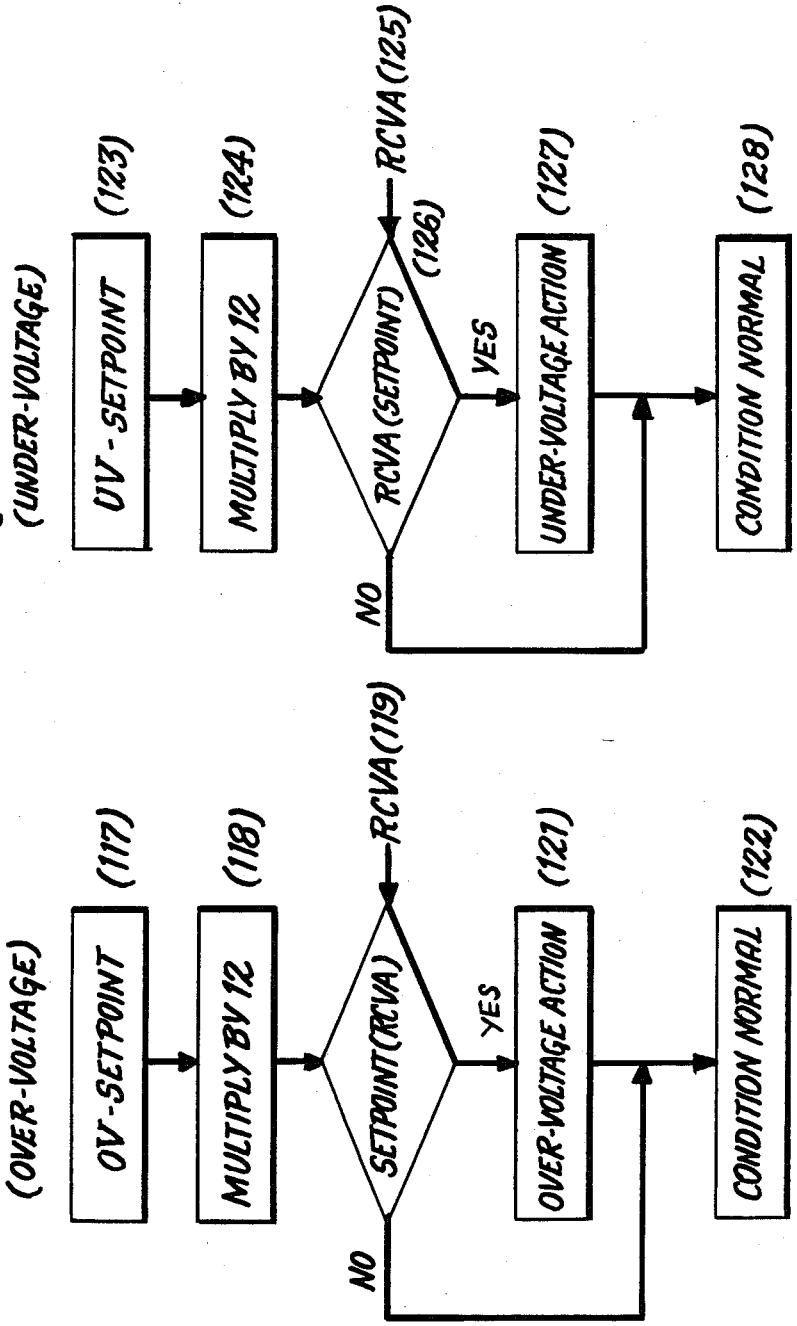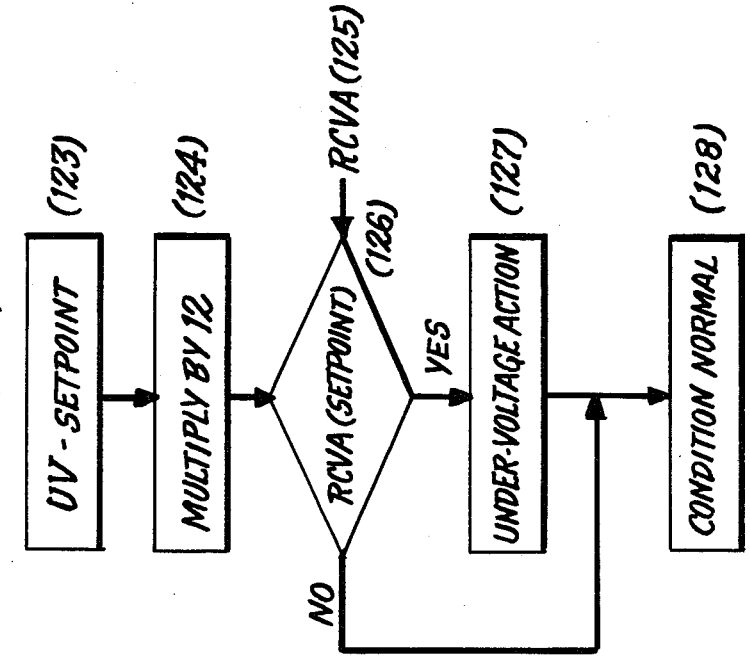

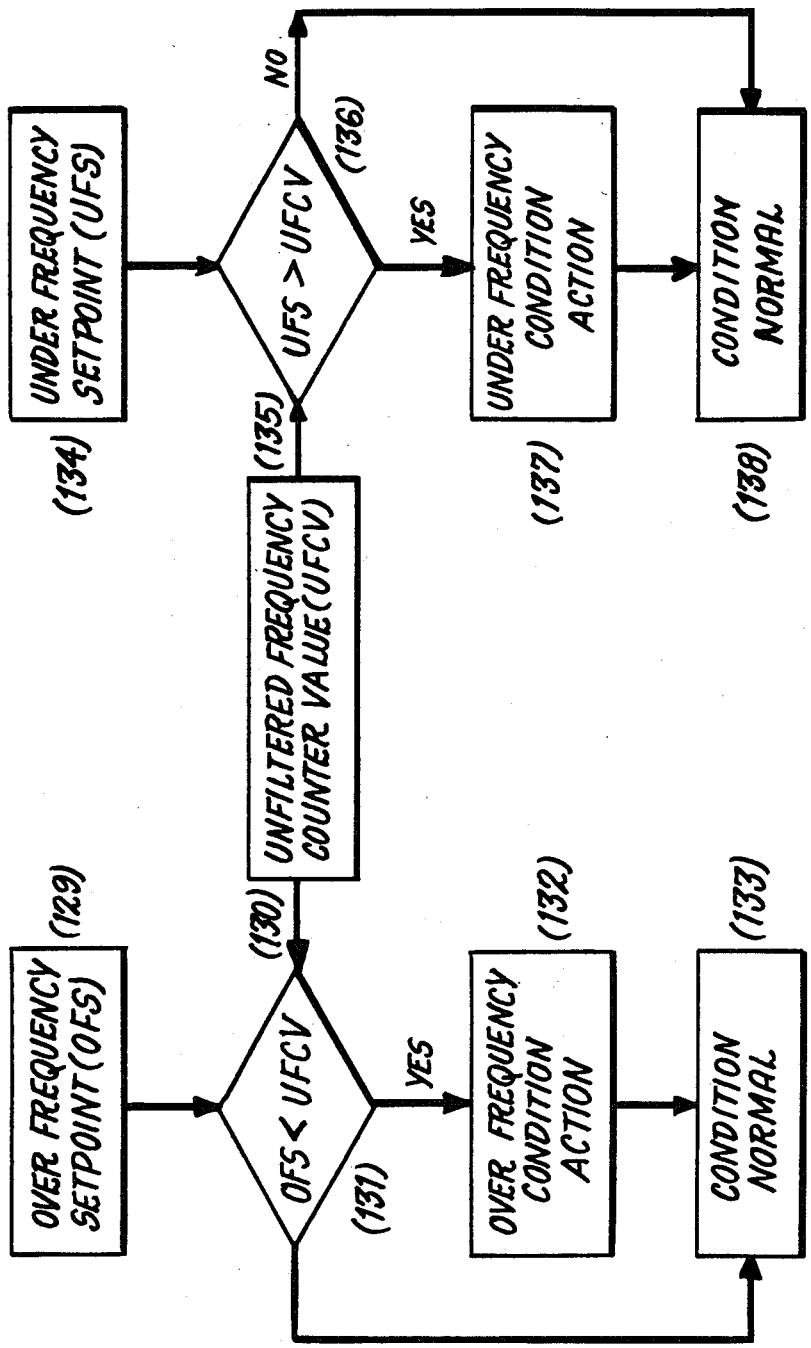

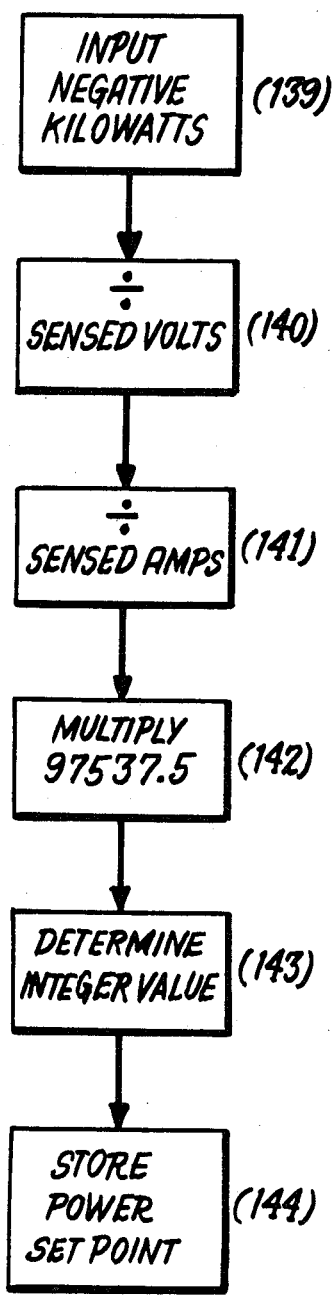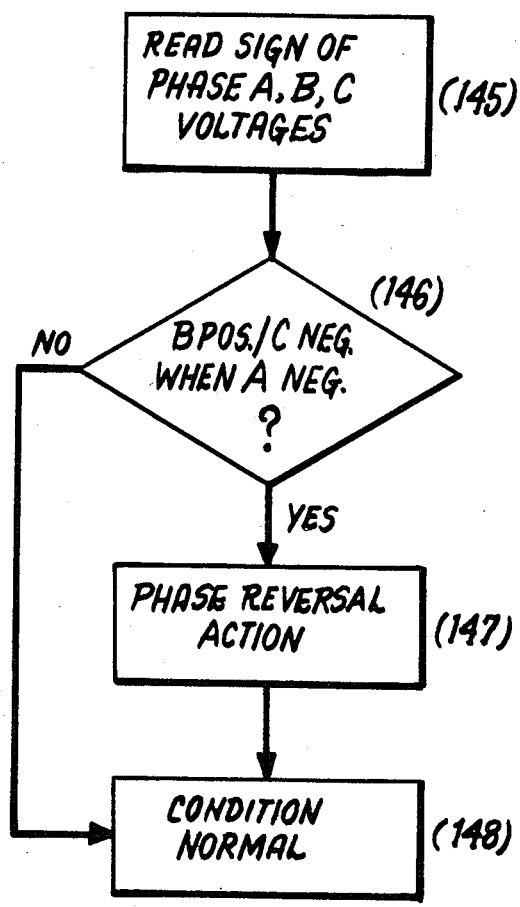

CIRCUIT BREAKER AND PROTECTIVE RELAY UNIT

BACKGROUND OF THE INVENTION

Total protection within an electrical power distribution circuit includes overcurrent protection to protect the circuit against excess current as well as protective relaying to protect the circuit from damage due to undervoltage and overvoltage and other conditions. U.S. Pat. No. 4,266,259 to E. K. Howell discloses an electronically activated circuit breaker wherein the trip unit operates in response to a family of curves derived from the relationship $I^2t = K$. This patent is incorporated herein for reference purposes. In order to provide for protection against undervoltage as well as overvoltage conditions, protective relaying is added to the circuit breaker as an accessory. One such accessory is described in U.S. Pat. No. 4,301,434 to Roger N. Castonguay. This patent is also incorporated herein for reference purposes. The accessory includes an undervoltage release solenoid which is mechanically linked with the trip operating mechanism to trip the breaker when the voltage falls below a minimum value. When the source of the overcurrent or undervoltage is located and corrected the breaker contacts must be manually reset and closed to allow the system to become operational. When other functions such as voltage metering, frequency metering or voltage-current unbalance measurements are required, further accessories, components and wiring are required for each of the functions. The purpose of the instant invention is to provide a circuit protection unit capable of providing total protection without requiring additional accessories and components along with the circuit protection device.

SUMMARY OF THE INVENTION

A circuit breaker unit having total circuit protection capability wherein the breaker contacts are controlled by a microcomputer programmed for interrupting the circuit upon conditions of overcurrent, underfrequency and undervoltage by means of a common trip solenoid. Self tests are continuously performed to insure operability of the circuit components and an automatic trip operation occurs upon a negative test indication. Instantaneous values of voltage, current, power factor and power are measured along with trip settings and voltage and frequency parameters.

BRIEF DESCRIPTION OF THE DRAWINGS

FIG. 6 is a flow chart diagram of the metering algorithm according to the invention;

FIGS. 7A and 7B are flow chart diagrams of the overvoltage and undervoltage algorithms according to the invention;

FIG. 8 is a flow chart diagram of the overfrequency and underfrequency algorithms according to the invention;

FIG. 9 is a flow chart diagram of the power reversal algorithm according to the invention; and FIG. 10 is a flow chart diagram of the phase reversal algorithm according to the invention.

DESCRIPTION OF THE PREFERRED EMBODIMENT

Figure 1:
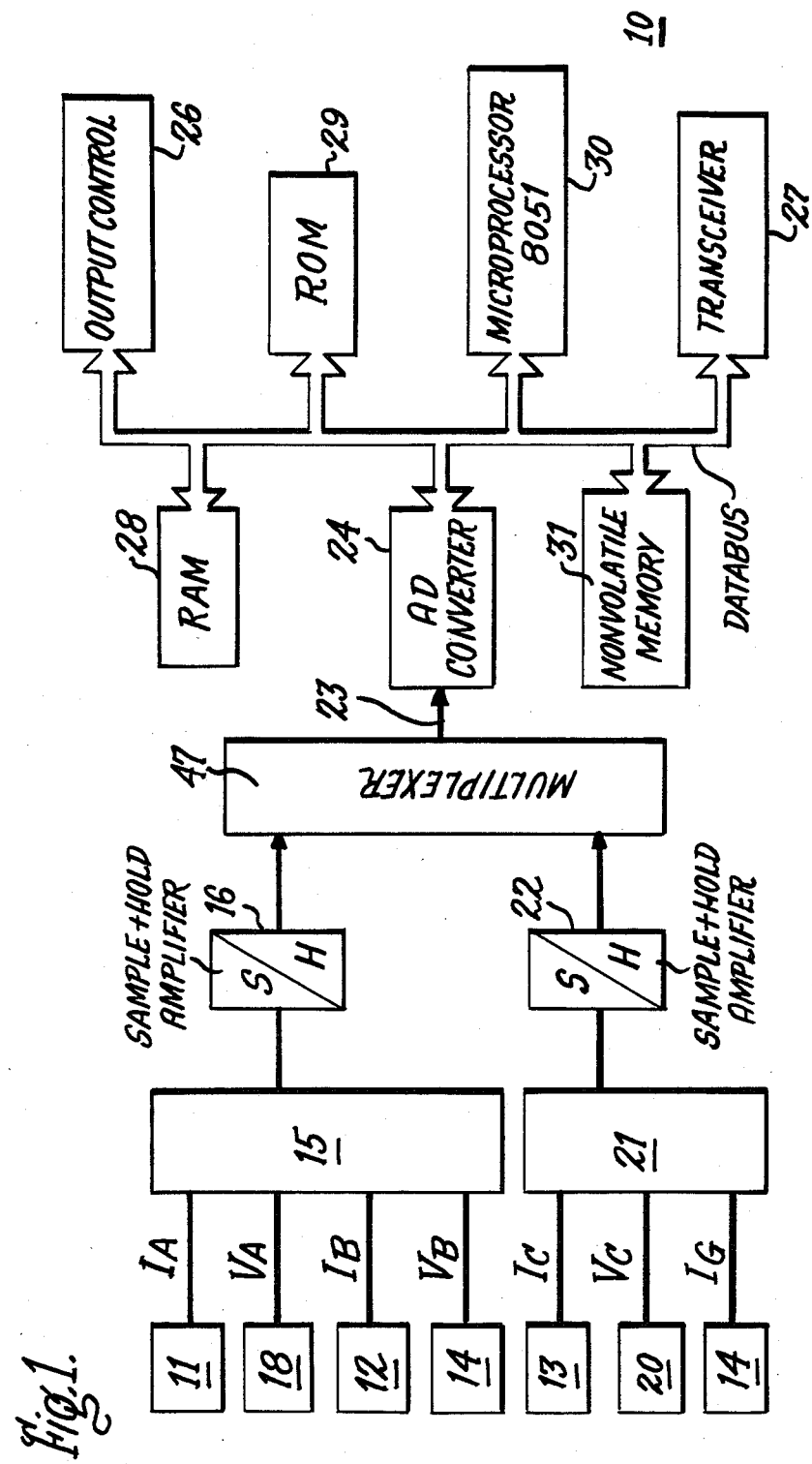
FIG. 1 is a diagrammatic representation of the circuit breaker controller according to the invention.

The conventional trip unit of a circuit breaker such as that described within the aforementioned patent to Howell is replaced by a circuit breaker controller 10 as depicted diagramatically in FIG. 1. The controller is in the form of a printed circuit card with all the circuit components except the current transformers 11-14 and the potential transformers 18-20 arranged on the same card. Each controller 10 includes a communication link such as a transceiver 27 connecting with a data bus 25. The transceiver can connect with other breaker controllers as well as with a remote central control unit depending upon the design of the system to be protected. The transceiver can be interconnected directly by a twisted pair communication line as well as over a power line carrier communication system such as that described within U.S. Pat. No. 4,408,186. One efficient transceiver for interconnecting the data bus with a source of carrier modulated data is that described within U.S. Pat. No. 4,583,232. Both of these are patents incorportated herein for purposes of reference. The current and voltage data received from the current and potential transformers are conditioned through multiplexers 15, 17, 21 and sample and hold amplifiers 16, 22 before inputting to the data bus through an AD converter 24. The microcomputer for the controller consists of a microprocessor 30, RAM, ROM and NVM elements 28-31 wherein the data is processed and commands are provided to an output circuit 26 to the associated circuit breaker contact operating mechanism to open and close the breaker contacts, as well as to the appropriate relays for switching loads should an energy management function be required or switching between generators and utilities to provide automatic throwover functions. This arrangement of a microcomputer, communication link and control circuit thereby allows complete control function to an electrical distribution system and also provides power factor correction by utilizing relays to switch remote capacitor banks under the appropriate programs stored within the microcomputer.

CIRCUIT BREAKER CONTROLLER

The circuit breaker controller of the invention is depicted in FIG. 1 as follows. The phase current transformers 11-13 are associated with phase currents IA, IB, IC, which currents are fed into two 4/1 multiplexers 15, 21. A separate ground fault current transformer 14 is employed in a similar manner to detect whether any ground fault current is present. The highest value of either of the three phase currents is determined within microprocessor 30 to decide whether a trip command should be issued to a flux shift trip unit via an output control circuit 26. A good description of the functional relationship between the current transformers, output control, trip coil and tripping mechanism of an electronically activated breaker is found the aforementioned patent to E. K. Howell. The current values are transmitted from multiplexer 15 through a sample and hold amplifier 16 to a 2/1 multiplexer 17. Three potential transformers 18-20 are associated with corresponding phase voltages in a manner similar to the current transformers and provide phase voltage values VA, VB, VC which are fed into 4/1 multiplexers 15, 21. The voltage values are transmitted through a sample and hold amplifier 22 to the 2/1 multiplexer 17. The voltage and current output values exiting from multiplexer 17 are inputted via conductor 23 to an A/D converter 24 and are outputted onto bus 25. The functions of RAM 28, ROM 29, microprocessor 30 and non-volatile memory (NVM) 31 are described as follows. RAM 28 is used for the temporary storage of current and voltage data and as a scratch pad memory. ROM 29 contains the programs which implement the circuit breaker controller functions such as overcurrent protection, metering, protective relaying and communications. These programs are depicted in FIGS. 4-10 and will be described below in some detail.

Microprocessor 30, a type 8051 microprocessor commercially available from Intel Corporation, is used for controlling the transceiver 27, NVM 31, A/D converter 24, RAM 28, output control 26 and bus 25, as dictated by the aforementioned programs stored in ROM 29. NVM 31 is an electrically erasable ROM which is commercially available from National Semiconductor Company of Santa Clara, California. NVM 31 retains the circuit breaker control set points which can only be modified by command instructions introduced onto bus 25 via the transceiver 27. This is an important feature of this invention and prevents inadvertent modification of the trip set point data at the circuit breaker which could otherwise present a problem. The set points stored in NVM 31 will be retained after all the electrical power to the breaker controller 10 is disconnected. These data points could also be stored in RAM 28, however, upon loss of power, the data would be lost. A known approach to selecting trip data from memory uses a potentiometer to vary voltage values in relation to the values of the set points in memory. This earlier approach, however, requires additional circuitry and utilizes memory space within the ROM to store the trip point data which is less economically feasible than the NVM memory employed herein.

A further advantage achieved by use of an electrically erasable ROM to store the breaker control set points is the ability to select certain features and functions for each user preference from a single Breaker Controller Design. This is achieved by assigning three bytes in the NVM 31 as the design option bytes and arranging the bytes in predetermined patterns. During the Breaker Controller manufacturing process, it is possible to encode the Breaker Controller to selectively enable or disable certain functions. For example, a user may not require ground fault protection in his specific application so that the ground fault protection bit in the NVM would not be set. Upon power-up, the microprocessor 30 reads the location of the three design bytes from the NVM and compares them to the set patterns defined in ROM 29. For the example given, the circuit breaker controller would not perform ground fault protection since the defined bit in the NVM is not set. By encoding the NVM as the last step in the manufacturing process, the circuit breaker controller could be customized to the end user's preference of options, features and functions from one Breaker Controller design without the need of designator pins or electrical connection jumpers.

As described within U.S. Pat. No. 4,550,360 the NVM could also contain calibration and correction factors. This patent is incorporated herein for reference purposes and should be referred to for a good description as to how the calibration and correction of a static trip circuit interrupter is carried out at the time of manufacture.

ANALOG INPUT AND SIGNAL CONDITIONING

Figure 2:
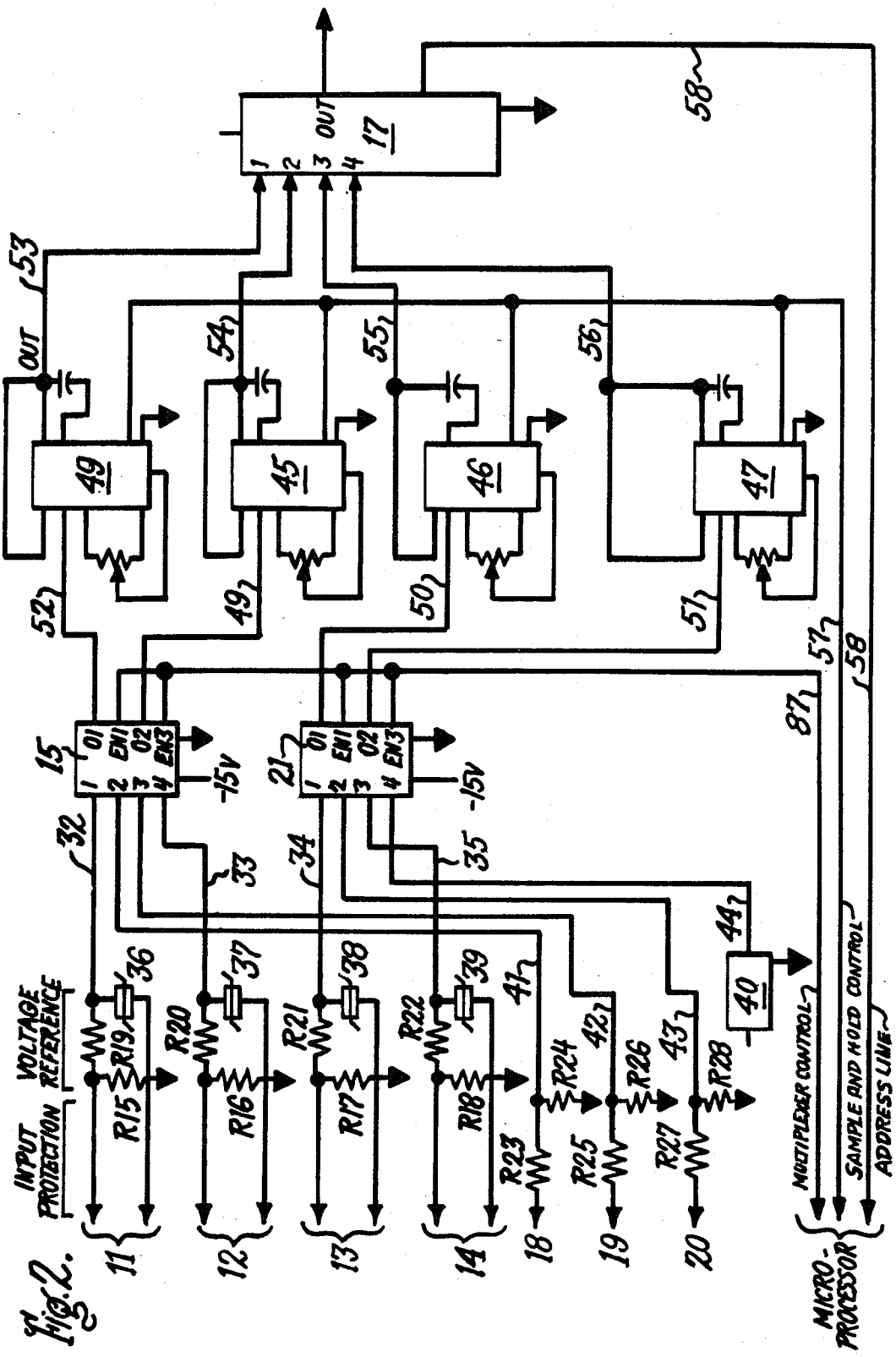
FIG. 2 is a diagrammatic representation of the analog input and signal conditioning circuit within the circuit breaker controller depicted in FIG. 1.
Figure 3:
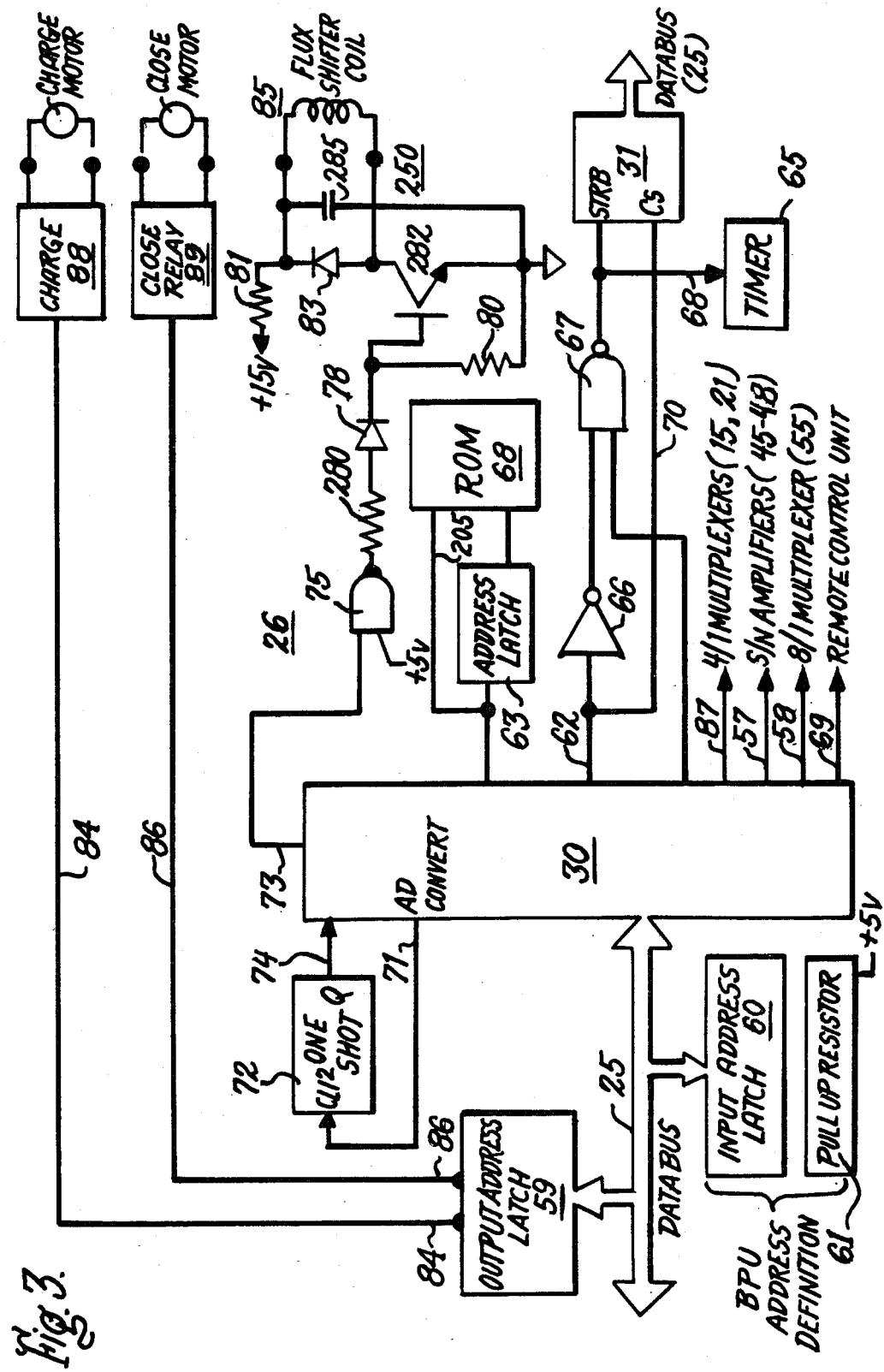
FIG. 3 is a diagrammatic representation of the output control circuit within the circuit breaker controller depicted in FIG. 1.

The analog input and signal conditioning circuit for use with the breaker controller of FIG. 1 is depicted in FIG. 2 with reference to FIG. 3 for connections with the microprocessor 30. The current transformers 11-14 of FIG. 1 are connected via leads 32, 33 to 4/2 multiplexer 15 and via leads 34, 35 to multiplexer 21. Burden resistors $R_{15}$-$R_{18}$ along with current limiting resistors $R_{19}$-$R_{22}$ and Zener diodes 36-39 perform a voltage conversion on the current transformer outputs as well as keeping the incoming signal to the multiplexers within a reasonable level to prevent damage to the circuit components in the event of a current surge. The potential transformers 18-20 of FIG. 1 are connected to multiplexers 15, 21 via leads 41, 42 and 43, respectively. Voltage dividing resistors $R_{23}$-$R_{28}$ limit the voltage input to the multiplexers to a reasonable level. Voltage regulator 40 is coupled with a +5V source and to terminal 4 of multiplexer 21 via lead 44 to perform self-test functions to the circuit to insure that the input and signal conditioning function is operational. The use of individual current and voltage phase inputs to the multiplexers allows each individual phase component to be addressed separately by means of a multiplexer control line 87 which connects multiplexers 15, 21 with an I/0 port of microprocessor 30 as best seen in FIG. 3. The outputs of multiplexers 15, 21 are inputted to sample and hold (S/H) amplifiers 44-47 by leads 49-52. The (S/H) amplifiers 44-47 comprise the component S/H amplifiers described generally as 16 and 22 in FIG. 1. The amplifier outputs are inputted to an 8/1 multiplexer 17 by leads 53-56. The individual voltage and current phase values are set and reset within the S/H amplifiers by instructions from the microprocessor via sample and hold control line 57 which connects with an output port of microprocessor 30. The voltage and current value for any individual phase can be obtained at the output of multiplexer 17 over line 23 by address line 58 which connects back to an I/O port of microprocessor 30.

CIRCUIT BREAKER CONTROLLER MICROCOMPUTER

The microcomputer part of the circuit breaker controller shown in FIGS. 1 and 3 consists of the microprocessor 30 in combination with ROM 29 and NVM 31, all interconnected as follows. An I/O port on microprocessor 30 is connected at line 69 with a modulated carrier communication bus or twisted pair digital data bus through transceiver 27. The transceiver is disclosed in the aforementioned U.S. Pat. No. 4,583,232 which should be referred to for a complete description of the transceiver components. The transceiver allows various information and commands from a remote control unit to be communicated to and from the microprocessor as well as providing a communication exchange between similar microprocessors in a distributed circuit protection system. All the instructions for operating the microprocessors relative to a specific communication protocol as well as the breaker trip and relay control instructions are stored in ROM 29. An I/0 port is connected both through latch 63 to ROM 29 and directly to ROM 29 via lead 64. Latch 63 allows data to be inputted to and outputted from the microprocessor from the same port. As described earlier, an output port on the microprocessor is connected via lead 58 back to multiplexer 17 within the breaker controller. Data from NVM 31 is outputted onto data bus 25 upon instructions from the microprocessor via ROM 29 and interconnecting line 64. To execute the output of data from ROM 29, information from an output port on the microprocessor is inputted over line 62 to NVM 31 through an inverter 66, and NAND gate 67. Timing pulses are provided from timer 65 which connects to the strobe terminal of the NVM over clock line 68. The input to inverter 66 is connected directly to the CS pin on NVM 31 via lead 70. Timer 65 simply times out the read and write functions in NVM memory 31 relative to signals to microprocessor 30 from multiplexer 17. The instructions for interfacing transceiver 27 between a carrier modulated communication bus and the data bus 25 and for obtaining the appropriate data from NVM 31 are also stored within ROM 29. When a plurality of controllers are interconnected on a common data bus or carrier modulated communication bus, it is important that each controller have its own particular address. This is provided by the input latch 60 and pull-up resistor 61 which are set to provide a particular address code for the particular controller depicted in FIG. 1.

OUTPUT CONTROL CIRCUIT

The output control circuit 26 within the circuit breaker controller of FIG. 1 is shown in FIG. 3. A trip line 73 connects an output port on microprocessor 30 with one input of gate 75. The other input is connected to a 5 volt reference. A trip signal is initiated from the microprocessor causing gate 75 to become conductive. The output of gate 75 connects through limiting resistor 77 and diode 78 to the base of power transistor 79 to turn on the transistor. Resistor 81 forms an RC circuit with capacitor 82 to store sufficient energy from the +15 volt supply when power transistor 79 turns on to energize the circuit breaker trip coil 85 and trip the breaker contacts. Diode 83 is connected across the trip coil to protect the circuit against energy feedback through the trip coil. Resistor 80 provides noise suppression between transistor 79 and ground.

The control relay portion 88 of the output control circuit 26 includes an output address latch 59 connecting with the data bus 25 for receiving control signals from microprocessor 30. Line 84 connects with relay 88 to charge the breaker operating mechanism motor prior to closing the contacts and line 86 connects with relay 89 to close the breaker contacts when the operating mechanism is fully charged. It is to be noted that the output control circuit 26 therefore has the facility to provide both protective relaying along with overcurrent protection. Should a circuit interruption be required due to an undervoltage or underfrequency condition, the trip signal is initiated over line 73 to operate the flux shifter coil 85 to trip the breaker and open the circuit. Heretofore, protective relaying and overcurrent protection functions were provided by two separate circuit interruption devices.

SAMPLING ALGORITHM

Figure 4:
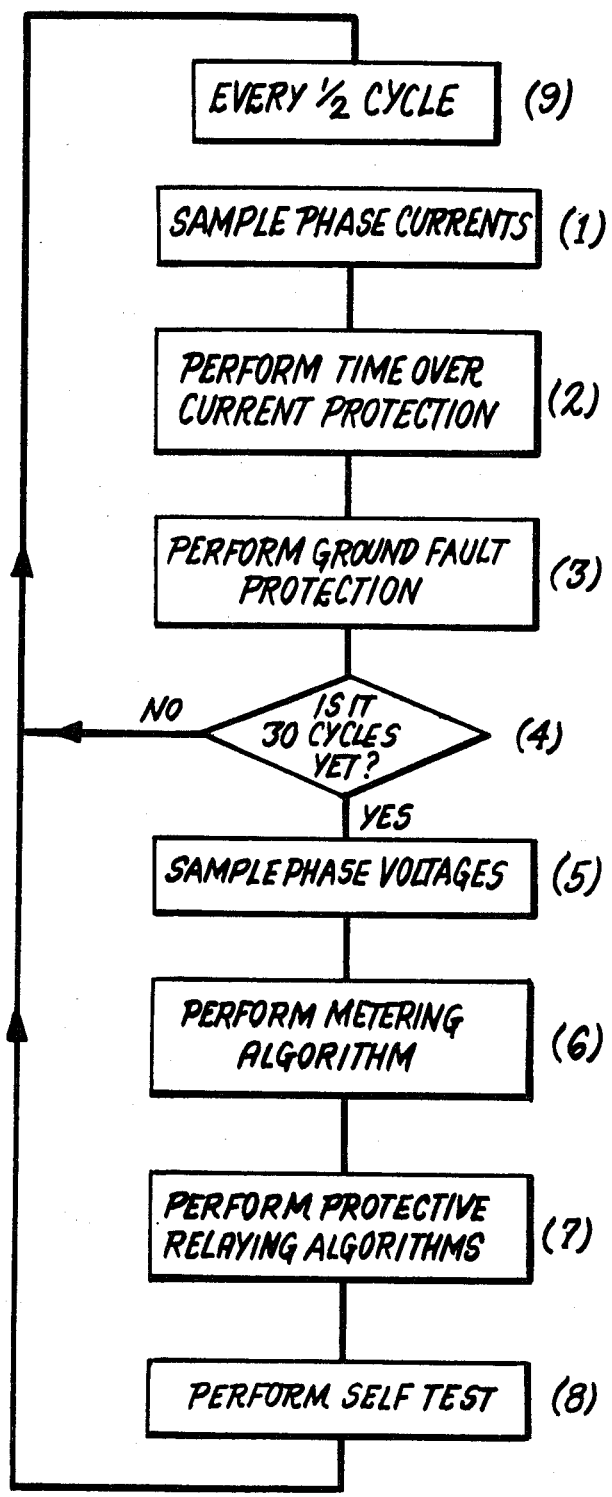
FIG. 4 is a flow chart of the sampling algorithm used within the circuit breaker controller according to the invention.
Figure 5A:
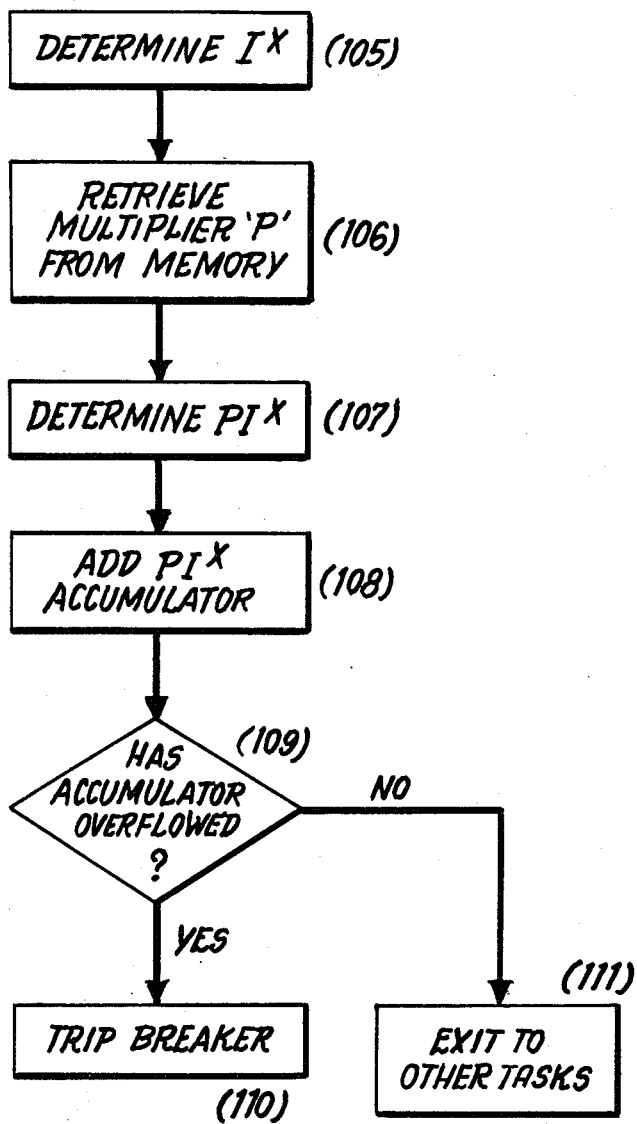
FIGS. 5 and 6 are flow chart diagrams of the time over current multiplier algorithm according to the invention.
Figure 6:
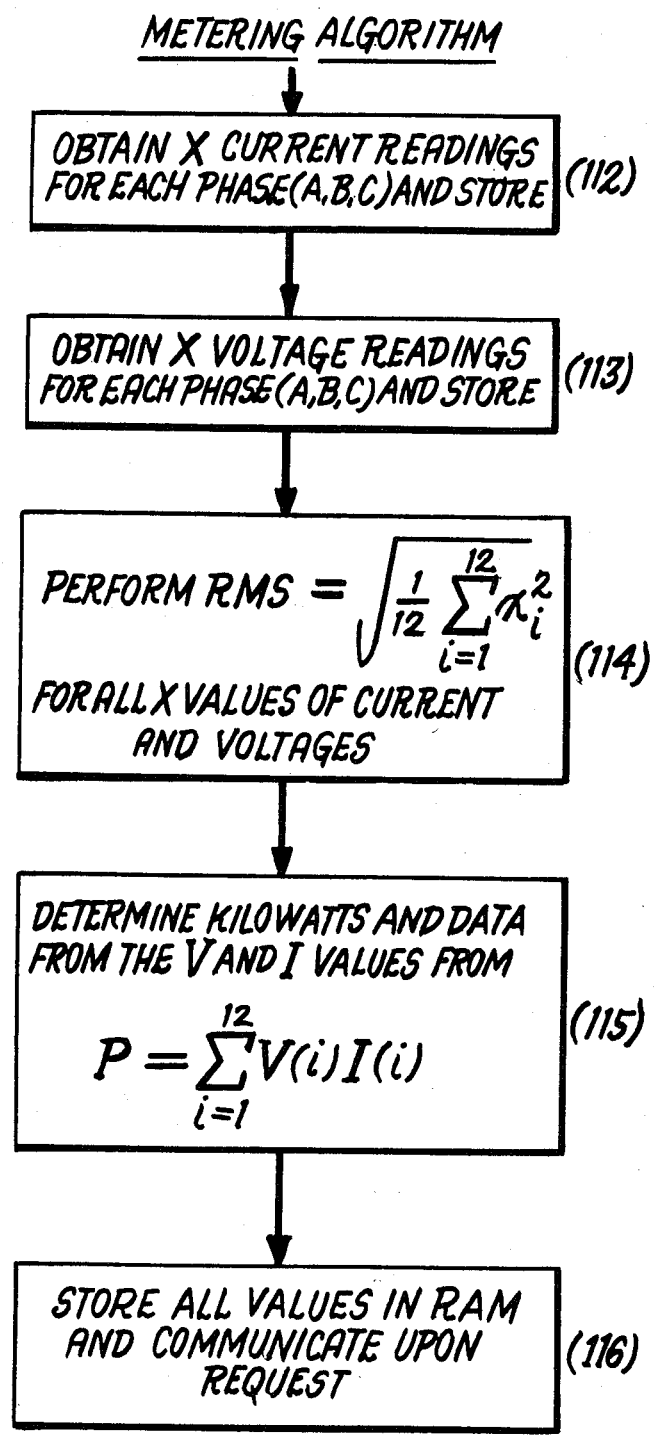

In order to provide protective relaying function to the electrical distribution circuit while maintaining overcurrent protection, the sampling algorithm depicted in FIG. 4 was developed and executes the following instructions. All phase currents are sampled on a continuing basis (1) and the time overcurrent protection algorithms depicted in FIGS. 5, 5A are performed (2). The ground fault protection algorithm is determined next (3) and a determination is made as to whether 30 cycles have elapsed (4) and, if not, steps 1–3 are repeated every half cycle (9). If 30 cycles have elapsed, then the phase voltages are sampled (5) and the metering algorithm is performed (6). One example of a suitable metering algorithm wherein the voltage, amperage, kilowatt and kilowatt hour RMS values are determined is depicted in FIG. 6. Next, the protective relaying algorithms are performed (7) wherein the presence of undervoltage, overvoltage, underfrequency and overfrequency, phase and power reversal conditions are determined. An algorithm used for measuring the power system frequency is disclosed in U.S. patent application Ser. No. 519,335 filed Aug. 1, 1983. An effective algorithm for providing time overcurrent protection wherein a dynamic history of the system parameters is continually compared to a predetermined threshold and the circuit is interrupted when the threshold is exceeded is given in U.S. Pat. No. 4,432,031 to W. J. Prelerlani. Both the aforementioned U.S. patent application and Patent are incorporated herein for reference purposes. The system then performs a self-test (8) wherein the ROM and RAM storage elements connected within the digital processor are tested. The contacts are operated to interrupt the phase currents upon indication that the ROM and RAM is non-functional.

METERING ALGORITHM

The metering algorithm for performing the metering function is stored within ROM 29 and is performed by the microprocessor 30 in FIG. 1 by the steps shown in the flow diagram depicted in FIG. 6. The values of current are obtained from the current transformers 11–13 and the values of voltage are obtained from the potential transformers 18–20 and are stored in RAM 28 (112, 113). The RMS value is obtained from 12 samples of each of the voltage and current values (114). The kilowatt and kilowatt hour data are determined from the RMS voltage and current values (115) and the values of all these parameters are stored in RAM 28 for communicating via transceiver 27 upon request (116). The phase voltages and phase currents are then displayed upon request.

TOC MULTIPLIER ALGORITHM

An efficient algorithm for solving the time over current relationship to provide both long time delay, short time delay and ground fault without requiring as much processor time as the aforementioned dynamic history algorithm approach comprises the time over current (TOC) multiplier algorithm.

The algorithm for the TOC multiplier is depicted in flow chart format in FIGS. 5 and 5A. The TOC multiplier algorithm solves the inverse time equation with errors of less than 5% with the 10 bit A/D converter 24 within the breaker controller 10 shown in FIG. 1 and utilizes three accumulators—one for the long time, short time and ground fault trip functions—each contained within microprocessor 30. Sampling consists of taking 12 samples each per cycle of the three phase currents and ground fault current, through multiplexer 15 and sample and hold amplifier 16. Each sample is squared within the microprocessor and the 12 consecutive samples are added to determine the square root. The root mean square value is then compared with the pickup current setting which is stored in non-volatile memory 31 and if the RMS value exceeds the long term, short term or ground fault pickup, then the corresponding appropriate accumulator is incremented by an amount "1" every n seconds. The increment "1" therefore changes when the RMS value changes. When the accumulator overflows, a trip signal is initiated by the microprocessor to trip the breaker via output control circuit 26.

The multiplication algorithm for solving the time over current equation is described as follows. For a particular value of current "I", the expression $T = KC^x \div I^x$ defines a particular time to trip (T), where T is in seconds and I is the current obtained from the current transformer in multiples of the percent rated current. C defines the multiples of current setting for long and short time and is equal to 1 for ground fault. x is the exponent of I and is equal to 2 for longer ground fault and is 2, 3 or 4.5 for the short time region of the time over current curve. K is the constant for the long time, short time or ground fault bands as described within the aforementioned publication which relates to the trip time curve. In operation, every n seconds, the microprocessor determines the root mean square value of I. If I is constant, then the increment 1 is also constant. In time T seconds, if I is constant, the number of times that the accumulator will be incremented is equal to T/n and the magnitude of the increment each time will be equal to 1. If the accumulator was initially at zero, the maximum value of the counter (Qmax) is determined by the expression $Qmax = (1)(T/n)$, or, in other words, $T = (n)(Qmax)/1$. From the previous expression for T, the following equality allows the expression for 1 to be derived directly:

$$1(n)(Qmax)/1 = KC^x/I^x$$

This translates to the following expression for 1:

$$1 = \frac{[(n)(Qmax)] I^x]}{[K C^x]}$$

since n, Qmax, K, C and x are all predetermined constants. Since the expression to the right of the equality is a constant, substituting the constant p equal to this value simplifies the expression to $p = I^x$. The amount that the accumulator is incremented by for any current value over pickup can now be determined by a single multiplication process. The value of 1 is added to the accumulator and upon overflow, a trip signal is initiated. In order to provide the necessary accuracy requirements for the time over current curves, the following values of Qmax and n were selected. The value of n for long time pickup was selected to be 48 milliseconds, for short time 8 milliseconds, and for ground fault 48 milliseconds. The value of Qmax for long time pickup is related to the accumulator width and for long time pickup is 24 bits, short time pickup 16 bits and ground fault pickup 8 bits. The value for Qmax is the maximum value that can be generated within the accumulator. For example, for long time pickup, Qmax is in hexadecimal notation, F repeated 6 times.

The implementation of the multiplication algorithm can best be seen by now referring to the flow chart diagrams depicted in FIGS. 5 and 5A and the breaker controller 10 depicted in FIG. 1 as follows with the program steps indicated in parentheses to avoid confusion with the drawing reference numerals. The current sampling subroutine (90) is carried out via current transformers 11-14, current multiplexer 15, sample and hold amplifier 16, multiplexer 17 and 10 bit AD converter 24. The digital value outputted from the AD converter is squared within microprocessor 30 (91). A determination is made as to whether the current sampling period is over (92) and if the answer is no, then the value for $I^2$ is added to the cumulative value stored in the accumulator within RAM 28 (100). This step is repeated for all three current phases. If the answer is yes, the sum of the squares for each of the three phases is compared to determine the largest of the three phase current sum of squares since the trip time curve is based on the worst, i.e., the highest value of the three phase currents (93). The mean square value of the cumulative samples is determined by dividing the sum by 12 (94) and the root mean square value is determined by taking the square root of the mean square (95). This results in the root mean square value of the highest phase current. This value is compared at first with the long time pickup (96) and if the RMS value is not greater than the LTP, no LTPU condition exists and the long time count is set to zero (101). The microprocessor is now available to provide other tasks. If the RMS value exceeds the LTPU, the comparison is made with the short time pickup (STPU) (97). If the RMS value exceeds the STPU, a short time pickup exists and the short time algorithm is executed (104). If the RMS value is not greater than or equal to the STPU, then the long time count is incremented by one (98). The long time count is determined and a comparison is made as to whether the long time count is equal to three and if the long time count is not equal to three, then the microprocessor is available to perform other tasks (101). If the long time count does equal three, the long-time time over current multiplication algorithm is executed (103). For a 60 hertz system, one cycle consists of approximately 16 milliseconds. By executing the long time over current routine only when the long time count is equal to 3, the long time over current algorithm is executed once every 48 milliseconds to insure long time over current accuracy.

The long time time over current algorithm routine is depicted in FIG. 5A. The short time over current routine is executed in a similar manner and will not be described here. The long time time over current routine is initiated by determining $I^x$ where I is the root mean square value (105). The long time multiplier value for p was previously stored in RAM 28 during initialization and is retrieved from memory (106) for determining the $pI^x$ value (107). This determination is made within microprocessor 30. The long time accumulator within RAM 28 is incremented by the $pI^x$ value (108) and a determination is made as to whether the accumulator has overflowed (109). If the accumulator has overflowed, the microprocessor initiates a trip signal (110). If the accumulator has not overflowed, the incremented accumulator value is stored in RAM 28 and the microprocessor is made available for other functions (111). FIGS. 5, 5A refer specifically to the long time over current and short time over current algorithms for determining the trip times. A similar routine is utilized for ground fault protection function using the same multiplication algorithm and will not be described herein.

PROTECTIVE RELAYING

The protective relaying algorithms are also stored within the ROM 29 of FIG. 1. The overvoltage algorithm is implemented by means of the flow chart depicted in FIG. 7A. An overvoltage set point is selected (117) and stored within RAM 28. This value is multiplied by 12 and the results are also stored in RAM 28 (118). The rectified sum of the composite voltage average (RCVA) is obtained and entered (119) and a determination is made as to whether the RCVA exceeds the overvoltage set point (120). If so, overvoltage action is taken (121) by tripping the breaker via output control 26 and communicating an overvoltage trip condition signal via transceiver 27. If the RCVA does not exceed the overvoltage set point, a condition normal signal is communicated via the transceiver upon request (122).

The undervoltage algorithm is also stored within ROM 29 and is implemented by means of the flow chart depicted in FIG. 7B. The undervoltage set point is selected (123) and stored within RAM 28. The value is multiplied by 12 and is also stored (124). The RCVA value is entered (125) and a determination is made as to whether the RCVA is less than the undervoltage set point (126). If so, undervoltage action is taken (127) by tripping the breaker and communicating an undervoltage trip condition signal via transceiver 27. If the RCVA is not less than the undervoltage set point, a condition normal signal is communicated via the transceiver upon request (128).

The overfrequency and underfrequency algorithms are also stored within ROM 29 and are alternatively executed within the microprocessor every other cycle by means of the flow chart depicted in FIG. 8. The overfrequency set point (OFS) is selected (129) and entered in RAM 28. The frequency is measured and an unfiltered frequency counter value (UFCV) is determined and entered (130). A comparison is made with the OFS (131) and if the UFCV is greater than the OFS, an overfrequency trip signal is transmitted from microprocessor 30 over bus 25 to the output control 26 and the breaker is tripped. An overfrequency condition signal is transmitted via transceiver 27 (132). If the UFCV is not greater than the OFS, a condition normal signal is transmitted via the transceiver upon request (133).

The underfrequency set point (UFS) is selected (134) and entered in RAM 28. The same UFCV is entered (135) and a comparison is made with the UFS (136). If the UFS is greater than the UFCV, an underfrequency trip signal is transmitted to the output control to trip the breaker and an underfrequency condition signal is transmitted (137). If the UFS is not greater than the UFCV, a condition normal signal is transmitted via the transceiver upon request (138).

The power reversal and phase reversal algorithms are implemented by means of the simplified flow chart diagrams within FIG. 9 and FIG. 10. The negative kilowatts value is determined per phase by the expression:

$$P = \sum_{i=1}^{12} V(i)I(i)$$

for 12 samples of the sensed voltage and current. A negative value in kilowatts is entered (139) and the sensed voltage value and current values are divided out (140, 141). The new negative kilowatts value is multiplied by 97537.5 (142) and the integer value of the result (143) is stored in RAM 28 as the power reversal set point for determination of power reversal (144).

The phase reversal determination is made by reading the sign of all three phase voltages A, B, C after each zero crossing (145). A determination is made as to whether the B phase voltage is positive or the C phase voltage is negative when the A phase voltage is negative heading (146). If so, a trip signal is sent to the output control 26 and the breaker is tripped. A phase reversal condition signal is also transmitted via receiver 27 (147). If the B phase voltage is positive and the C voltage is negative when the A voltage is negative heading, a condition normal signal is transmitted via the transceiver upon request (148).

CIRCUIT BREAKER COMPONENT SELF TEST

The AD converter signal 71 from the microprocessor 30 is also used to trigger a "watch dog" timer one shot 72 as shown in FIG. 3. Since the AD converter is sampling at a known frequency, a longer time out period is used in the watch dog one shot. Each time the AD converter samples, the one shot is retriggered and hence never gets a chance to time out. The output of the one shot is therefore "high" as long as the circuit breaker protection functions are operational. Self test routines in ROM 29 periodically test the status of input line 74 to test the validity of the watch dog monitor.

If, due to some malfunction, the watch dog monitor times indicating a non-protecting condition, the microprocessor 30 will detect the condition and initiate a trip through output control line 73.

We claim:

1. A method of providing overcurrent and protective relaying protection comprising the steps of:
    sampling phase currents within a protected electrical system;
    performing time over current protection by comparing said phase currents to predetermined values and operating separable contacts within said electrical system to interrupt said phase currents;
    performing ground fault current protection by determining the presence of ground fault current and operating said separable contacts to interrupt said ground fault current;
    sampling phase voltages within said protected electrical system;
    performing protective relaying by comparing said phase voltages to predetermined values and operating said separable contacts within said electrical system to interrupt said phase currents;
    testing ROM and RAM storage elements connected with a digital processor within said electrical system; and
    operating said contacts to interrupt said phase currents upon indication that said ROM or RAM is nonfunctional.

* * * * *